United States Patent Office 3,402,627
Patented Sept. 24, 1968

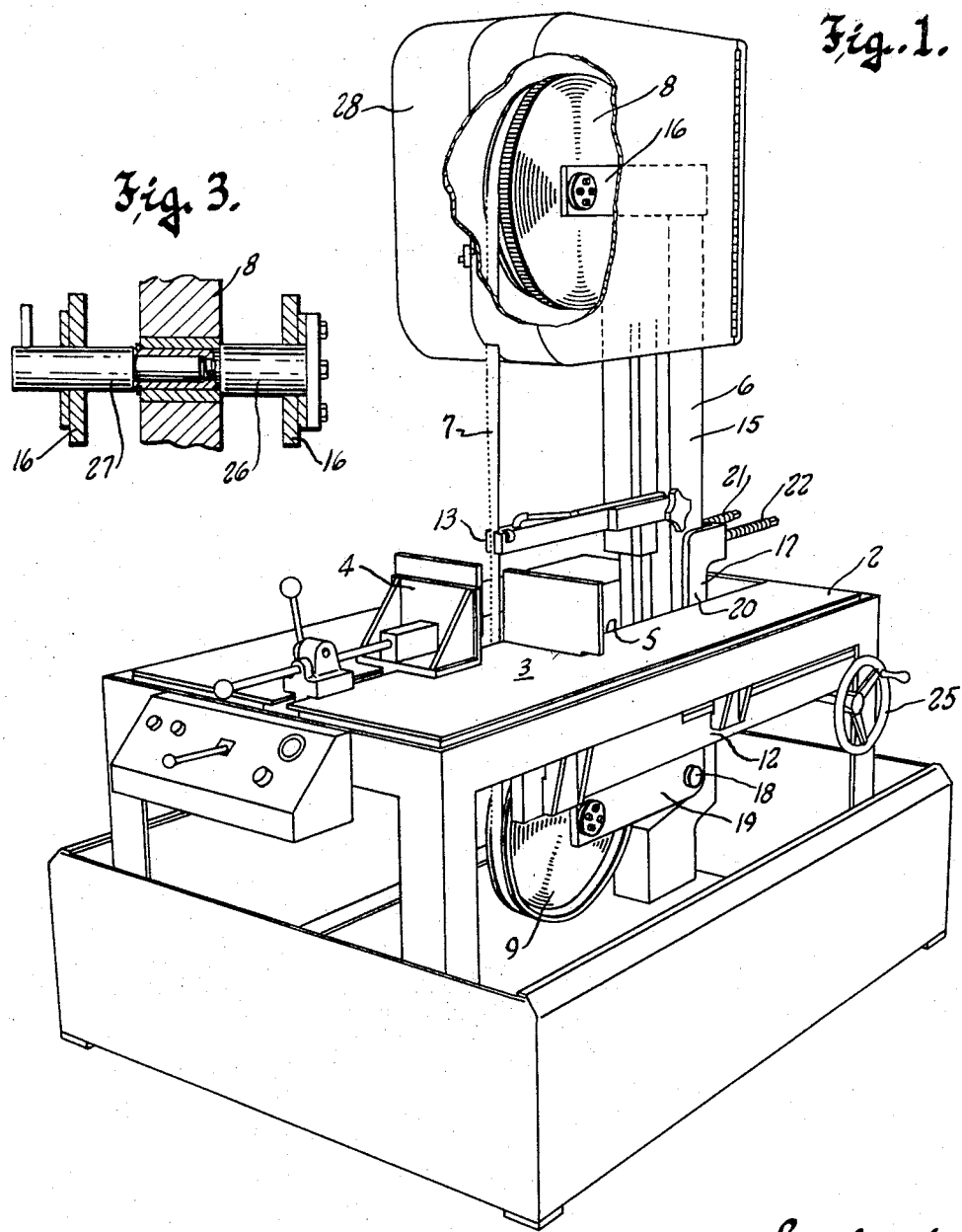

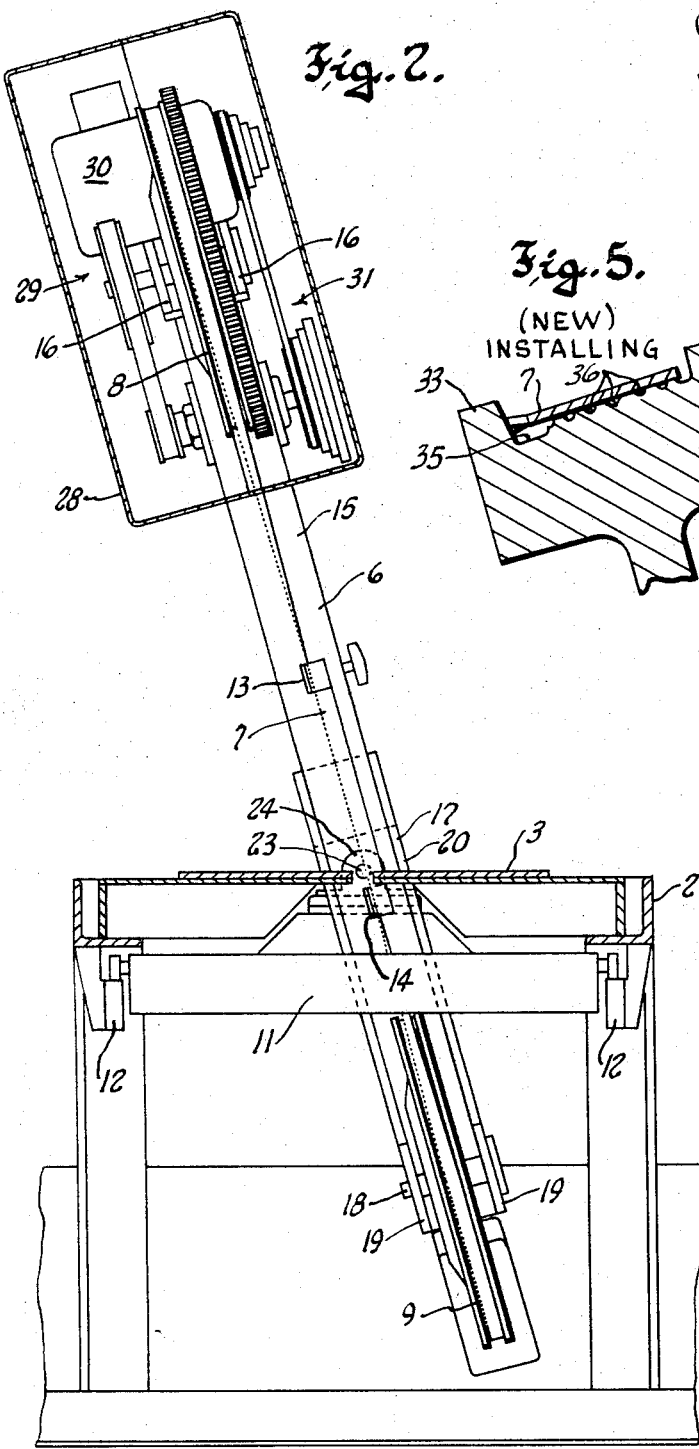

3,402,627
BAND SAW WITH IMPROVED BAND WHEELS
LaRoy E. Robinson, Hopkins, and Albert D. Mills, Minnetonka, Minn., assignors to Continental Machines, Inc., Savage, Minn., a corporation of Minnesota
Filed Aug. 8, 1966, Ser. No. 571,067
1 Claim. (Cl. 83—201.14)

ABSTRACT OF THE DISCLOSURE

A tilting band saw having improved band wheels is disclosed. The band wheels are provided with circumferential backup and retainer flanges encircling the rim of each wheel and spaced apart a distance greater than the width of the saw band.

---

This invention relates to band saws which employ an endless saw band trained over spaced wheels, and has as its purpose and object to facilitate placement and replacement of the saw band on its carrying wheels.

Installation of saw bands has never been easy, but in band saws of the tilting frame type it is especially difficult. In band saws of this type, the work to be cut rests upon a stationary bed or table and an upright frame on which the band wheels are mounted extends through an opening in the table and moves along a horizontal path to advance the downwardly travelling stretch of the saw band through a workpiece on the table. The upright saw frame is tiltably mounted on a carriage which rides on tracks at the underside of the table. The tiltability of the frame mounting permits the frame to be tilted to and secured in any position within a relatively wide angle—usually forty-five degrees to either side of vertical. Hence, saws of this type are widely used in cutting structural members to length, where the cuts often must be made at an oblique angle.

When the saw frame is tilted, the band wheels, of course, rotate in inclined planes so that one side edge thereof faces in a downwardly inclined direction. As a result, if the band must be installed or replaced while the saw frame is tilted—as is sometimes the case—the task becomes most difficult, since the band, in its necessarily slack condition, will not remain on the wheels and must be held there while the wheel spacing is adjusted to place the band in tension. This is practically impossible for one person to do alone.

To overcome the problem, this invention provides an improved band wheel which has means thereon to hold a slack band in position, even when the saw frame is tilted.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention, constructed according to the best mode so far devised for the practical application of the principles thereof, and in which:

FIGURE 1 is a perspective view of a tilting frame band saw embodying this invention;

FIGURE 2 is a vertical sectional view through the saw, viewing the same from the front and showing the saw frame tilted;

FIGURE 3 is a fragmentary detail sectional view through the hub portion of one of the band wheels, to illustrate the manner in which the wheels are mounted;

FIGURE 4 is a cross sectional view through the rim portion of a conventional band wheel, to illustrate why it was difficult in the past to install a saw band on the band wheels of a tilting frame band saw;

FIGURE 5 is a cross sectional view through the rim portion of the improved band wheel of this invention, illustrating the manner in which it facilitates installation of the band; and FIGURE 6 is a sectional view, similar to FIGURE 5, but illustrating the band in the position it occupies during operation of the machine.

Referring now particularly to the accompanying drawings, the numeral 2 designates the stationary frame of a band saw of the tilting type which, as is customary, has a horizontal work-supporting bed or table 3 equipped with a work-gripping vise 4 and an opening 5 to accommodate an upright saw frame 6. Work placed upon the table and in the grip of the vise may be cut by the downwardly travelling stretch of saw ban 7 that is trained over vertically spaced upper and lower band wheels 8 and 9 mounted on the saw frame 6. This frame travels in the opening 5 in the table and is mounted on a carriage 11 which rides on parallel horizontal tracks 12 that extend fore and aft beneath the table 3, suitable power means (not shown) being provided to impart the desired motion to the carriage.

To enable the saw to cut through the workpiece as the saw frame moves towards the front of the table, the downwardly travelling cutting stretch of the saw band is twisted ninety degrees so that its cutting edge faces forwardly. The twist is effected and maintained by saw guides 13 and 14 mounted on the saw frame 6. These guides, as is customary, have opposed shoes slideably engaging the opposite faces of the saw band. The guide 13 is located above the table and is adjustable up and down to accommodate different work heights and enable the cutting stretch of the saw band to be as short as possible. The other guide 14 is located beneath the table.

The saw frame 6 consists essentially of a column 15 having a pair of rigid arms 16 projecting forwardly from its upper end portion to embrace and mount the upper band wheel 8, and a bell crank-shaped weldment or structure 17 at its lower end to mount the lower band wheel 9.

The weldment 17 is pivoted to the column 5, as at 18, and has one arm 19 thereof projecting forwardly from the column and formed with spaced members to embrace and mount the lower band wheel. The other arm 20 of the bell crank-shaped weldment extends upwardly from the pivot 18 and embraces the rear of the column. Movement of the arm 20 towards the column 15 thus rocks the bell crank-shaped weldment about its pivot 18 in the direction to pull the lower band wheel downward to tension the saw band, while movement of the arm 20 away from the column lifts the lower band wheel and relieves the saw band of tension. Any suitable means may be provided to effect this adjustment, as for instance a pair of screws 21 and 22 arranged to react in opposite directions between the column 15 and the arm 20.

As noted hereinbefore, the saw frame 6 is tiltable to either side of vertical. To enable such tilting of the frame, its mounting on the carriage 11 is in the nature of a hinge and consists of a pin 23 passing through the column 15 and supported at its ends in pillow blocks 24 on the carriage. The axis of the pin 23 is horizontal and passes through the cutting edge of the saw band, preferably as close as possible to the level of the table top.

Any suitable means may be employed to tilt the saw frame, and in the present case a hand wheel 25 actuates mechanism (not shown) by which this adjustment is accomplished.

Placement of an endless saw band upon its carrying wheels requires access to one side or face of both wheels, or welding the band into an endless loop after it has been threaded through the wheel supports and any other opening through which the band travels. The former arrangement is, of course, the most convenient, but it entails mounting the wheels on journals that are supported only at one end. This calls for rather husky supporting structure if the desired stability is to be had.

In the present case, the needed stability is obtained by supporting the wheel journals at both ends, but in a manner which enables the supports at one side of the wheels to be quickly removed. One way in which this may be done is illustrated in FIGURE 3. As here shown, the journals for the band wheels comprise fixed journal posts 26, and cooperating removable supporting shafts 27 that telescope into and are screwed to the posts. The band wheels are journalled on the posts 26 and are retained in position thereon whether the removable supporting shafts 27 are present or not.

The post 26 upon which the upper band wheel is journalled is fixed to one of the arms 16, and the post 26 upon which the lower wheel is journalled is fixed to one of the spaced members of the arms 19 of the weldment 17. The removable supporting shafts 27 are seated in holes in the adjacent portions of the wheel supports—namely, the other arm 16 for the upper wheel, and the other member of the arm 19 for the lower wheel.

When both of the shafts 27 are unscrewed from their respective posts 26, an endless saw band may be applied to the wheels from one side thereof. For the upper wheel this requires opening a door 28 which forms part of a housing for the upper wheel and the drive mechanism 29 by which the saw band is driven. The bottom portion of the looped band is simply dropped down through the hole in the table.

Although the manner in which the saw band is driven forms no part of this invention, it is notable that, in this case—as distinguished from the more conventional practice—it is the upper wheel which is driven. Thus the drive motor 30 and the transmission 31 by which the upper band wheel is drivingly connected with the motor, are mounted on the upper portion of the saw frame within the housing of which the door 28 forms a part.

As will no doubt be appreciated, when a saw band is to be installed, the upper and lower wheels must be moved closer together than they would be when the saw band is in place thereon and properly tensioned. It is, of course, also necessary that the supporting shafts 27 be unscrewed from their respective posts 26. Now, with these things done, the endless saw band may be hung onto the upper wheel and its bottom loop applied to the lower wheel. Assuming that the band dutifully retains this position embracing the rims of the upper and lower wheels, the band saw should now be tensioned by manipulation of the adjusting screws 21 and 22, but before this can be done, the front stretch of the band must be inserted into the slots between the shoes of the saw guides 13 and 14. With all of this accomplished, the band is ready to be tensioned.

If the saw frame 6 was in an erect vertical position at the time the saw band is being installed, the operator might not experience too much difficulty keeping the band in place while band tensioning adjustment is being made; but if the saw frame is tilted as shown in FIGURE 2 so that the accessible faces or sides of the band wheels face in a downwardly inclined direction, one man alone can not do the job, and even two men would find it extremely trying with the band wheels as they existed prior to this invention, for as depicted in FIGURE 4, the band would slip off the rim of the wheels.

However, with the improved band wheels of this invention, the task becomes an ordinary, relatively easy operation. As shown in FIGURES 5 and 6, the band wheels of this invention have two axially spaced circumferential outwardly projecting flanges 32 and 33 on and encircling their rims 34. The first of these flanges provides a backup against which the non-cutting back edge of the saw band bears during operation of the saw, at which time the other flange 33, which may be considered a retainer flange, is spaced from the cutting edge of the saw band, as shown in FIGURE 6. However, when the band is slack, as it must be during application thereof to the wheels, the two flanges coact, as shown in FIGURE 5, to hold the band from slipping off the wheels even when the saw frame is tilted to a steep angle.

Obviously, the axial distance between the two flanges must be greater than the width of the saw band, otherwise the cutting edge of the band would rub against the flange 33, and to further assure that no part of the wheels will touch the cutting edge of the band during operation, the rims 34 are reduced in diameter adjacent to the flanges 33 to provide clearance grooves or channels 35.

Preferably the treads of the wheel rims have grooves 36, which as more fully brought out in Patent No. 2,865,214, increase traction between the wheels and the band.

From the foregoing description, it will be apparent that although the structural changes required to incorporate the improvement of this invention into band saws may be regarded as slight, the advantages achieved thereby are substantial.

What is claimed as our invention is:

1. In a tiltable band saw having a horizontal work table to support a workpiece to be cut, a saw frame mounted to tilt in either direction from a vertical position about a horizontal tilt axis and having an upper portion above the work table and a lower poriton below the work table, band wheels rotatably carried by said upper and lower portions of the saw frame with their axes parallel and transverse to the tilt axis of the saw frame, and endless saw band trained over said wheels with one stretch thereof passing through the work table, means driving one of said wheels in the direction to impart downward travel to said stretch of the saw band, saw guides carried by the saw frame above and below the work table engaging said downwardly travelling stretch of the saw band and holding the band twisted with the portion thereof which spans the distance between the guides in the general plane of the saw frame and at right angles to the parallel axes of the wheels, and means on the saw frame to adjust the spacing of the wheels so that the band may be tensioned after it is mounted on the wheels and properly engaged with its guides, the improvement by which the mounting of a band on the wheels is facilitated especially when this must be done while the saw frame is tilted, said improvement comprising:
circumferential backup and retainer flanges on and encircling the rim of each wheel, said flanges being spaced apart a distance greater than the width of the saw band, so that during operation of the band saw when the band is tensioned the backup flange supportingly engages the back edge of the saw band while the retainer flange is spaced from its front cutting edge,
said flanges coacting to hold the saw band on the wheels during application of the band and before the band is tensioned.

References Cited

UNITED STATES PATENTS

| | | | |
|---|---|---|---|
| 2,253,515 | 8/1941 | Grob et al. | 143—30 X |
| 2,705,510 | 4/1955 | Stocke | 143—19.4 X |
| 2,896,490 | 9/1957 | Kennedy | 143—31 X |
| 3,034,387 | 5/1962 | Sebastian | 83—201 X |

FOREIGN PATENTS 652,832  11/1937  Germany.

WILLIAM S. LAWSON, *Primary Examiner.*